US012728830B2

(12) United States Patent
Jankowski et al.

(10) Patent No.: US 12,728,830 B2
(45) Date of Patent: Sep. 8, 2026

(54) TRACTOR TRAILER WITH SELF-CONTAINED BRAKE RELEASE CAPABILITIES FOR AUTONOMOUS YARD SHIFTING

(71) Applicant: Airgo IP, LLC, Oklahoma City, OK (US)

(72) Inventors: Peter Jankowski, Edmond, OK (US); Adwait Kulkarni, Oklahoma City, OK (US); William E. Long, Edmond, OK (US)

(73) Assignee: Airgo IP, LLC, Oklahoma City, OK (US)

( * ) Notice: Subject to any disclaimer, the term of this patent is extended or adjusted under 35 U.S.C. 154(b) by 505 days.

(21) Appl. No.: 18/234,726

(22) Filed: Aug. 16, 2023

(65) Prior Publication Data

US 2025/0058753 A1 Feb. 20, 2025

(51) Int. Cl.
*B60T 13/26* (2006.01)
*B60T 7/20* (2006.01)

(52) U.S. Cl.
CPC ............ *B60T 13/263* (2013.01); *B60T 7/203* (2013.01); *B60T 13/268* (2013.01)

(58) Field of Classification Search
CPC .... B60T 13/263; B60T 13/268; B60T 13/662; B60T 7/20; B60T 7/203; B60W 2300/14–145; B60W 60/00–007
See application file for complete search history.

(56) References Cited

U.S. PATENT DOCUMENTS

| | | | | |
|---|---|---|---|---|
| 3,929,381 | A | 12/1975 | Durling | |
| 5,929,532 | A | 7/1999 | Sell | |
| 8,583,100 | B2 | 11/2013 | Koziy et al. | |
| 11,099,560 | B2 | 8/2021 | Smith et al. | |
| 11,429,099 | B2 | 8/2022 | Smith et al. | |
| 11,567,514 | B2 | 1/2023 | Musk et al. | |
| 11,618,289 | B2 | 4/2023 | Johnson et al. | |
| 2019/0299952 | A1* | 10/2019 | Niglas | B60T 17/221 |
| 2020/0269822 | A1* | 8/2020 | Magzimof | B60T 13/662 |
| 2020/0356107 | A1 | 11/2020 | Wells | |

(Continued)

FOREIGN PATENT DOCUMENTS

| | | | | |
|---|---|---|---|---|
| GB | 2310695 B | 10/1999 | | |
| WO | WO-2019030105 A1 * | 2/2019 | | B60T 13/22 |

*Primary Examiner* — David R Morris
(74) *Attorney, Agent, or Firm* — Hall Estill Law Firm

(57) ABSTRACT

Method and apparatus for providing self-contained brake release capabilities in a tractor trailer to facilitate autonomous movement of the trailer within a controlled environment such as in a yard, depot or other facility. Pressurized air is stored in a reservoir of the trailer while the trailer is in a stationary, parked position. Upon receipt of a wirelessly transmitted brake release command, a trailer controller circuit transitions a flow valve to interconnect the reservoir to a brake assembly to apply pressure sufficient to release the brake assembly and enable rolling movement of a wheel assembly of the trailer. In this way, a yard shifter or other transport vehicle can mechanically engage and move the trailer without the need to provide pressurized air or electrical power to the tractor trailer in order to release the brakes. Security protocols can be used to ensure the brake release operation is performed under authorized conditions.

26 Claims, 7 Drawing Sheets

(56) References Cited

U.S. PATENT DOCUMENTS

| | | | | |
|---|---|---|---|---|
| 2021/0061034 | A1 | 3/2021 | Moore et al. | |
| 2021/0082220 | A1 | 3/2021 | Boerger et al. | |
| 2023/0145675 | A1* | 5/2023 | Johannes | B60D 1/62<br>280/420 |

* cited by examiner 100
101
108
102
102A
110
104
114
106
102B
112
118
116

120
102
102A
110
121
122
106
102B
112
118
116

SELF-CONTAINED BRAKE RELEASE
CONTROLLER 132
RESERVOIR 134
COMPRESSOR (OPTIONAL) 136
SENSORS 138
VALVE ASSY 140
POWER 142
RX/TX 144
130
146
AIR LINE CONDUITS
116
BRAKE ASSY
118
PNEUMATIC SOLENOID ASSEMBLY 148
PAD/DISC 150

TRACTOR TRAILER WITH SELF-CONTAINED BRAKE RELEASE CAPABILITIES FOR AUTONOMOUS YARD SHIFTING

BACKGROUND

Yard shifters are light duty vehicles that are used to move tractor trailers around a yard, depot or other facility. In a commercial depot environment, it is common to use yard shifters to move trailers from a parking area to a loading bay, where the trailers can receive freight (e.g., cargo, equipment, fluid, products, or other transported goods) prior to being coupled to a long haul tractor rig for transport and delivery of the freight to a distal location.

Modern yard shifters can take a variety of forms, including manned or autonomously guided short haul vehicles. The shifters are provided with a powertrain having sufficient power and torque to safely maneuver the trailers at low speeds in both forward and reversed directions. The powertrain may be electrically based or may be powered with a gasoline or diesel internal combustion engine (ICE).

Regardless of form, the shifters employ a mechanical coupling mechanism to enable the shifter to engage and shunt the trailer to the destination location. The mechanical coupling mechanism often takes the form of a horseshoe-shaped coupling device (e.g., a fifth wheel) that receives a corresponding mount device (e.g., kingpin) that extends downwardly from a front portion of the trailer.

Normally, additional connections are required to couple a yard shifter to a trailer. These connections can include an electrical connection in order to supply electrical power to various electrical loads of the trailer including lights, sensors, brakes, etc. A pneumatic connection is also required to supply pressurized air (or other pressurized fluid) to release the brakes of the trailer and enable the trailer to be moved.

Many modern semi-tractor trailers utilize spring-activated, air pressure released trailer parking brakes. Such brakes require the presence of pressurized air at a suitably high pressure (such as e.g., 70 pounds per square inch, psi) in order to maintain the brakes in an unreleased state. In the absence of the applied pressurized air, spring biased brake pads are brought into automatic engagement with corresponding discs or similar braking surfaces (e.g., drums, etc.). The use of spring-activated, air pressure released brakes provides an important safety feature that enables the wheels of a trailer to be normally locked in a brake-engaged condition unless pressurized air is supplied.

The pressurized air is normally supplied by a pressurized source in the long haul tractor rig. One common arrangement uses an air compressor that is driven by the tractor engine and which accumulates a volume of pressurized air in a tractor rig reservoir (tank). The air in the tractor rig reservoir is supplied to the braking system of the trailer using a suitable conduit (e.g., one or more pressurized air hoses) to interconnect the rig to the trailer. The air supplied to the trailer can be used for other purposes as well, such as by a tire pressure monitoring and adjustment system that maintains the internal pressure of the tires used to support the trailer at suitable levels.

When a trailer is parked and disconnected from a tractor rig, the air pressure in the trailer braking system is vented and the wheels of the trailer become automatically locked. A yard shifter thus needs to supply the necessary pressurized air to the braking system of the trailer before the trailer can be moved around the yard. Electrical power may need to be supplied to the trailer as well.

Yard shifters usually include an onboard pressurized air reservoir and a pneumatic hose conduit which is connected to a corresponding coupling of the trailer. In this way, the yard shifter provides the necessary pressurized air to the trailer being moved using the same connection arrangement that is used by a long haul tractor rig.

Autonomous yard shifter configurations can include a robotic end effector that automatically locates and connects the conduit(s) to the trailer. Manned yard shifters usually require the human driver to get out of the vehicle and manually attach the conduit(s) to the trailer. In each case, external air (and oftentimes, power) connections are required before the trailer can be moved.

SUMMARY

Various embodiments of the present disclosure are generally directed to systems and methods for autonomously shifting trailers through the use of a self-contained brake release system.

Without limitation, some embodiments provide a tractor trailer with self-contained brake release capabilities. The tractor trailer includes a frame supportable on a roadway by a wheel assembly. The wheel assembly has an air-release brake assembly configured to respectively facilitate rotation of the wheel assembly responsive to a pressure of pressurized air within a brake inlet conduit being above a selected pressure level, and to prevent rotation of the wheel assembly responsive to the pressure of the pressurized air within the brake inlet conduit being below the selected pressure level.

A coupling mechanism is supported by the frame and is configured for mating engagement with a transport vehicle for towed movement of the trailer by the transport vehicle. A reservoir is supported by the frame to store pressurized air. A flow valve is supported by the frame and is arranged in fluidic communication with the reservoir and the brake inlet conduit of the brake assembly.

A trailer controller circuit is supported by the frame and configured to perform a self-contained brake release operation while the trailer is in a stationary, parked position without a presence of pressurized air from an external source. The trailer controller performs the self-contained brake release operation to release the brake assembly and permit relocation of the tractor trailer via rolling movement of the wheel assembly by, responsive to receipt of a wireless brake release command, transitioning the flow valve from a first valve position in which the reservoir is fluidically isolated from the inlet brake conduit to a second valve position in which the reservoir is fluidically coupled to the inlet brake conduit and the pressurized air from the reservoir flows through the brake inlet conduit to the brake assembly at a pressure that is at or above the selected pressure level.

In further embodiments, a method includes steps of storing a volume of pressurized air in a reservoir supported by a frame of a tractor trailer, with the tractor trailer having a wheel assembly with an air-release brake assembly configured to respectively facilitate rotation of the wheel assembly responsive to a pressure of pressurized air within a brake inlet conduit being above a selected pressure level and to prevent rotation of the wheel assembly responsive to the pressure of the pressurized air within the brake inlet conduit being below the selected pressure level.

A brake release command is received by a trailer controller circuit via a wireless communication channel while the trailer is disposed in a stationary parked position, the trailer controller circuit being supported by the frame.

The trailer controller circuit is used to perform a self-contained brake release operation responsive to receipt of the brake release command by transitioning a flow valve supported by the frame in fluidic communication with the reservoir and the brake inlet conduit of the brake assembly from a first valve position in which the reservoir is fluidically isolated from the inlet brake conduit to a second valve position in which the reservoir is fluidically coupled to the inlet brake conduit and the pressurized air from the reservoir flows through the brake inlet conduit to the brake assembly at a pressure that is at or above the selected pressure level.

These and other features which may characterize various embodiments can be understood in view of the following detailed discussion and the accompanying drawings.

DETAILED DESCRIPTION

Figures 1, 2, 3:
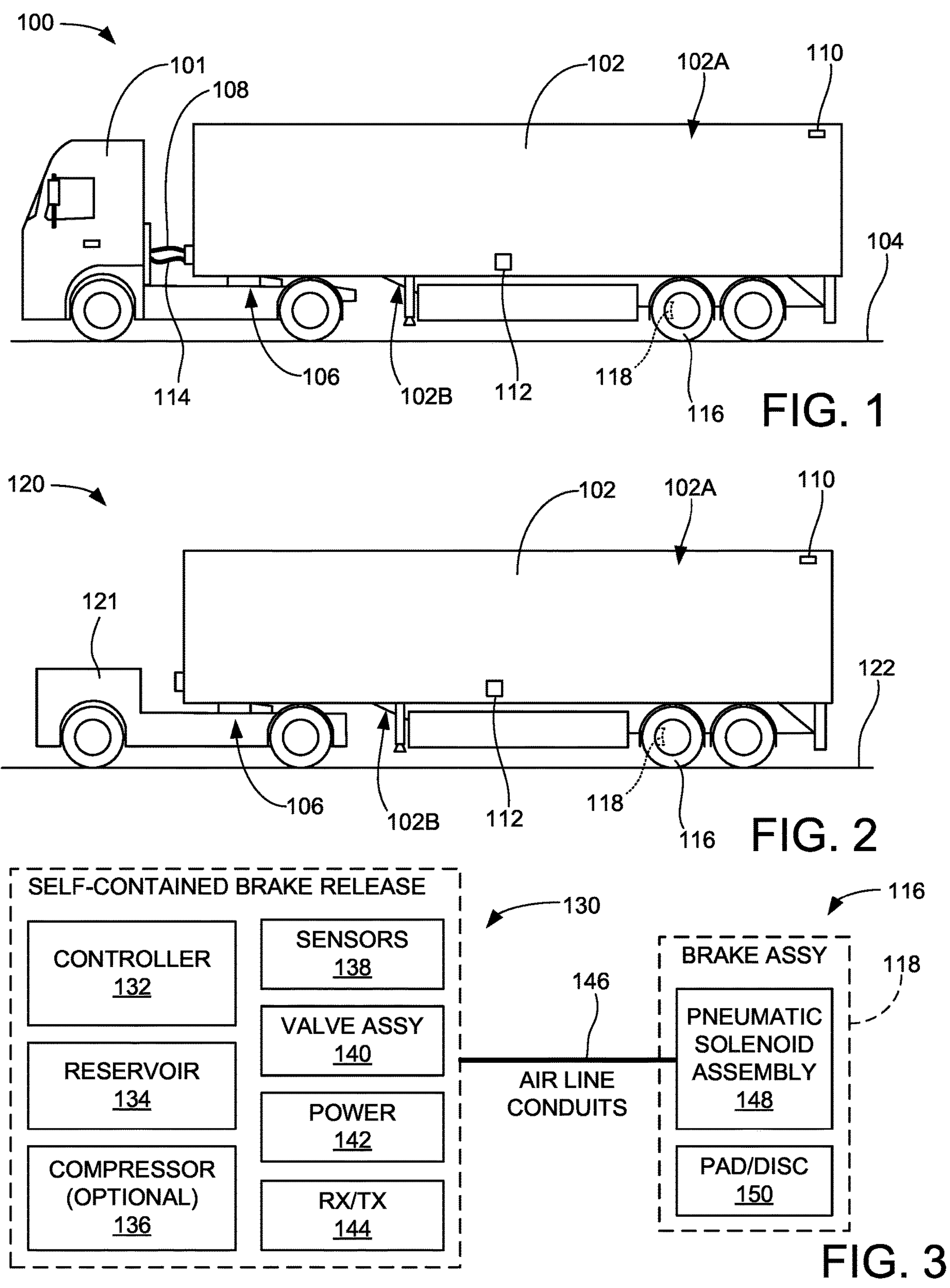
FIG. 1 depicts a long haul tractor trailer rig assembly having a trailer constructed and operated in accordance with some embodiments.
FIG. 2 depicts a yard shifter trailer rig assembly having the trailer from FIG. 1.
FIG. 3 is a functional block representation of a self-contained brake release system of the trailer of FIGS. 1-2 in accordance with some embodiments.

Various embodiments of the present disclosure are generally directed to systems and methods for providing self-release braking capabilities in a tractor trailer to facilitate autonomous movement of the trailer within a controlled environment such as in a yard, depot or other facility. While the trailer is particularly suitable for the use with autonomous yard shifters, other operational environments are contemplated, including the use of manned yard shifters as well as non-yard shifter applications such as the open road utilization of the brake-release system with an otherwise conventional long haul tractor rig, etc.

As explained below, various embodiments may include an autonomous vehicle for use in a yard or other location where multiple trailers may be stored and moved around in preparation for attachment to a conventional tractor trailer rig for a long distance delivery.

To this end, the autonomous vehicle, which in some embodiments may be unmanned and may be electric or ICE powered, will automatically connect, move and disconnect the various trailers, such as in a depot environment where the trailers are moved to a dock or loading position to allow the loading/unloading of freight. It will be appreciated that such movements will tend to require that the trailers be both moved in forward and reverse directions, and that substantially all of the normally functional systems of the trailer (e.g., running lights, brake lights, ABS braking systems, pneumatic systems, sensors, etc.) will need to be in an active, operative state during such movements.

Normally, the brakes on the tractor trailer are pneumatically powered and thus require a supply of pressurized air or other fluid at a selected pressure in order to operate and release the brakes. Various embodiments reduce or eliminate the need to have a human or a robotic end effector make an electrical and pneumatic interconnection to the trailer in order to supply the pressurized air to the trailer, as well as provide other advantages and benefits.

A control unit on the trailer wirelessly communicates with a transceiver unit at the yard to enact the brake release functions. This will require the use of one or more pressurized reservoirs (tanks) to be incorporated into the trailer and charged with sufficient air to enable the brakes to be released and re-engaged as required. In some cases, the tank(s) are existing tanks used during normal long haul operation of the trailer. In other cases, the tanks may be additional tanks supplied for the self-contained brake release function. Regardless, the tanks may be charged based on the most recent usage of the trailer, and sufficient volume will be retained at sufficient pressure to allow some finite number of self-contained engagement and release cycles without requiring a recharging operation.

A specially configured valve assembly can be used which operates under the control of the trailer-based controller to pressurize the brake lines and release the trailer. Because no electrical or pneumatic interconnections are being made between the autonomous vehicle and the trailer, the trailer will also use a separate power supply that provides sufficient power to enable operation of the controller and the valve, as well as other electrical loads of the trailer as required. It is contemplated that rechargeable batteries or the like may be installed, and recharged once normal interconnection is made with a conventional tractor trailer rig.

Other embodiments include the use of communication protocols and software sequences that include the ability to use various sensors to track the various trailers, identify which one needs to be placed where, what freight needs to be loaded, and so on as part of the trailer relocation process. The disclosure contemplates the use of one or more cloud based servers that may be referenced during this control aspect of the system. Various sensors can be used to detect the locations of the trailers, features thereof, terrain surrounding, etc. as the vehicles are dispatched and used to move the trailers around the yard. Security protocols can be used to authenticate the unlocking and locking of the brakes of a designated trailer in a secure fashion. In some cases, geolocation and other requirements can be implemented to prevent the unauthorized engagement or disengagement of the trailer brakes at times and locations other than by an authorized party.

As noted above, the use of autonomous yard shifters is generally known in the art, but these still tend to require one or more electrical and pneumatic interconnections with the trailer in order to enable movement thereof. By contrast, the various embodiments of the present disclosure eliminate the need to perform such interconnections, thereby making the entire process automated in a self-contained fashion.

These and other features and advantages of various embodiments can be understood beginning with a review of FIG. 1 which provides a simplified representation of a long haul tractor trailer rig assembly 100. The rig assembly 100, also sometimes referred to as a semi-trailer truck, a semi, an eighteen-wheeler, a tractor-trailer, etc., includes a tractor 101 coupled to a trailer 102.

The tractor 101 is contemplated as constituting, except as described below, an otherwise substantially conventional long haul semi-tractor vehicle, such as of the type that includes a large displacement diesel engine (not separately shown) configured to enable long distance delivery of freight stored within the trailer 102 via a suitable roadway (e.g. highway) 104. Any number of different types and styles of tractors 101 can be utilized including long nosed tractors, cab-over tractors, gasoline powered or electrically powered devices, autonomous vehicles, manned vehicles, vehicles with extended cabs, etc.

The trailer 102 is contemplated as constituting, except as described below, an otherwise substantially conventional long haul trailer. In this embodiment, the trailer 102, also sometimes referred to as a tractor trailer, is an enclosed type trailer with a container 102A supported by an underlying frame 102B. The interior of the container 102A may be accessed by one or more doors (not shown), which may be located along the rear or sides of the container. While an enclosed trailer is shown, substantially any form of tractor trailer can be utilized including tank-style trailers, flat-bed trailers, trailers with different numbers of wheels, jointed trailers with separately coupled sections, segmented trailers, and so on.

The trailer 102 is coupled to the tractor 101 via a fifth-wheel style coupling mechanism 106, which includes a fifth wheel coupling surface on the tractor 101 that engages a kingpin that extends downwardly from the front portion of the trailer 102. Other mechanical coupling configurations to secure the trailer to the tractor for the towing thereof can be utilized as desired.

Additional interconnections are supplied between the tractor 101 and the trailer 102, including a flexible electrical conduit 108 that provides insulated electrically conductive signal and power wires or other conductors to interconnect various system loads and systems of the trailer 102. While not limiting, some of these electrical loads of the trailers can include illumination lights such as depicted at 110, and proximity sensors such as depicted at 112. Other loads can include electronic braking systems, brake lights, position detection mechanisms, relays, valves, and so on.

Another interconnection supplied between the tractor 101 and the trailer 102 is a flexible pneumatic conduit 114. As explained below, this conduit 114 provides a supply of pressurized air (or other pressurized fluid) to a spring-activated, air pressure braking system of the trailer 102 (not separately shown in FIG. 1). The braking system controllably enables or restricts the rolling of various wheel assemblies 116 that support the trailer 102 on the underlying roadway surface 104 via engagement or release of various brake assemblies 118 associated with each of the wheel assemblies 116 responsive to the pressurized air supplied via the conduit 114.

While a single electrical conduit 108 and a single pneumatic conduit 114 are depicted in FIG. 1, it will be noted that any number of respective conduits can be included as needed, including multiple electrical and/or multiple pneumatic connections with different voltages, signal configurations, pressures, fluids, etc.

FIG. 2 provides a simplified representation of a yard shifter trailer rig assembly 120 constructed and operated in accordance with further embodiments. The assembly 120 utilizes the same trailer 102 as in FIG. 1, but this time the trailer is coupled to a yard shifter vehicle 121 in order to move the trailer around a controlled environment (e.g., a yard, a parking area, a depot, etc.) via a roadway surface 122.

In this example, the yard shifter vehicle 121 is an electrically powered, autonomous (e.g., driverless) vehicle that moves the trailer 102 in an automated fashion. However, other forms of yard shifter vehicles can be used including ICE powered vehicles, manned vehicles that are driven by human operators, power-assisted, pallet-jack type vehicles that can be operated by a walking human operator, and so on.

The yard shifter vehicle 121 uses the same type of coupling mechanism configuration as in FIG. 1 (e.g., a fifth wheel/kingpin arrangement) to establish mechanical engagement between the vehicle 121 and the trailer 102. However, unlike the arrangement in FIG. 1, the yard shifter arrangement in FIG. 2 does not require or use the respective electrical and pneumatic conduits 108, 114 that were utilized with the long haul tractor 101.

Instead, the trailer 102 utilizes a self-contained brake release system with its own electrical power and/or air pressure to enable the yard shifter vehicle 121 to move the trailer 102 over the road surface 122. A generalized representation of the self-contained brake release system is shown at 130 in FIG. 3. It will be understood that the arrangement in FIG. 3 is merely exemplary and other configurations can be used as desired.

The self-contained brake release system 130 includes a controller 132, a pressurized air reservoir (tank) 134, an optional air compressor 136, sensors 138, a valve assembly 140, an electrical power source 142 and a communication circuit 144 with both receiver (Rx) and transmitter (Tx) capabilities to provide wireless communications via a suitable protocol.

During operation, the pressurized air within the reservoir 134 is directed, via the valve assembly 140 and one or more internal air line conduits 146, to a pneumatic solenoid assembly 148 that makes up a portion of the brake assembly 118 in each wheel assembly 116 of the trailer 102 (see FIGS. 1-2). The activation of the pneumatic solenoid assembly 148 operates upon a pad/disc combination 150 within the brake assembly 118 to release the brakes and allow rolling operation of the associated wheel assembly 116.

At this point it will be noted that the controller 132, also sometimes referred to as a trailer controller circuit, may be a hardware based and/or programmable processor based microcontroller circuit to provide top level control of the system 130. In some embodiments, the controller 132 includes a programmable processor and associated program instructions (e.g., firmware, software) in an associated memory location to execute the various control functions carried out by the system.

The reservoir 134 may be a single tank or multiple tanks adapted to store a volume of pressurized air during operation. The tank(s) may be the same tank(s) used during normal operation of the trailer in the long haul configuration of FIG. 1, or may be separate tanks that are utilized only for controlled brake release functions in conditions as in FIG. 2.

The sensors 138 can take any suitable number of forms including pressure sensors, flow rate sensors, proximity sensors, etc. In some cases, sensors that are normally used by the trailer 102 during long haul transport (e.g., weight sensors, blind-spot traffic sensors, engagement sensors, etc.) can be included within this grouping of sensors and used as described herein.

The compressor 136 may be a relatively small volume, 12V electrically driven compressor selectively operated under the control of the controller 132 based on pressure levels sensed by the sensors 138 to fill or replenish the supply of pressurized air in the reservoir 134. The valve assembly 140 can be one or more valve arrangements used to direct, regulate and/or inhibit the flow of pressurized air within the system.

The power source 142 may be a rechargeable battery (including an otherwise conventional 12V automotive/truck/marine battery) with associated regulation and charging capabilities. The power source 142 can be used to supply electrical power to the various loads of the brake release system 130 (including, for example, the controller 132, the compressor 136, the sensors 138, etc.) and can be recharged as needed using the electrical power supplied from the long haul tractor 101 in FIG. 1 via the electrical conduit 108.

Finally, the Rx/Tx communication circuitry 144 can be utilized to enable communication of the controller 132 with the external environment, including but not limited to wireless communications with the autonomous yard shifter 121 in FIG. 2. Communications can additionally be provided with other elements, including a base station unit (not shown in FIGS. 1-2) associated with the yard, with authorized user devices via satellite, cellular, local area network, other networks and protocols, etc. In some cases, the system 130 can be configured to communicate with the long haul tractor 101 as well.

In some embodiments, the system 130 communicates using the proprietary Lo-Ra spread spectrum communication protocol that utilizes license-free sub-gigahertz radio frequency bands in various spectra. This is merely exemplary and is not limiting, however, as any suitable wireless communication protocol can be used as desired, including but not limited to cellular, WiFi, Bluetooth, etc.

Figure 4:
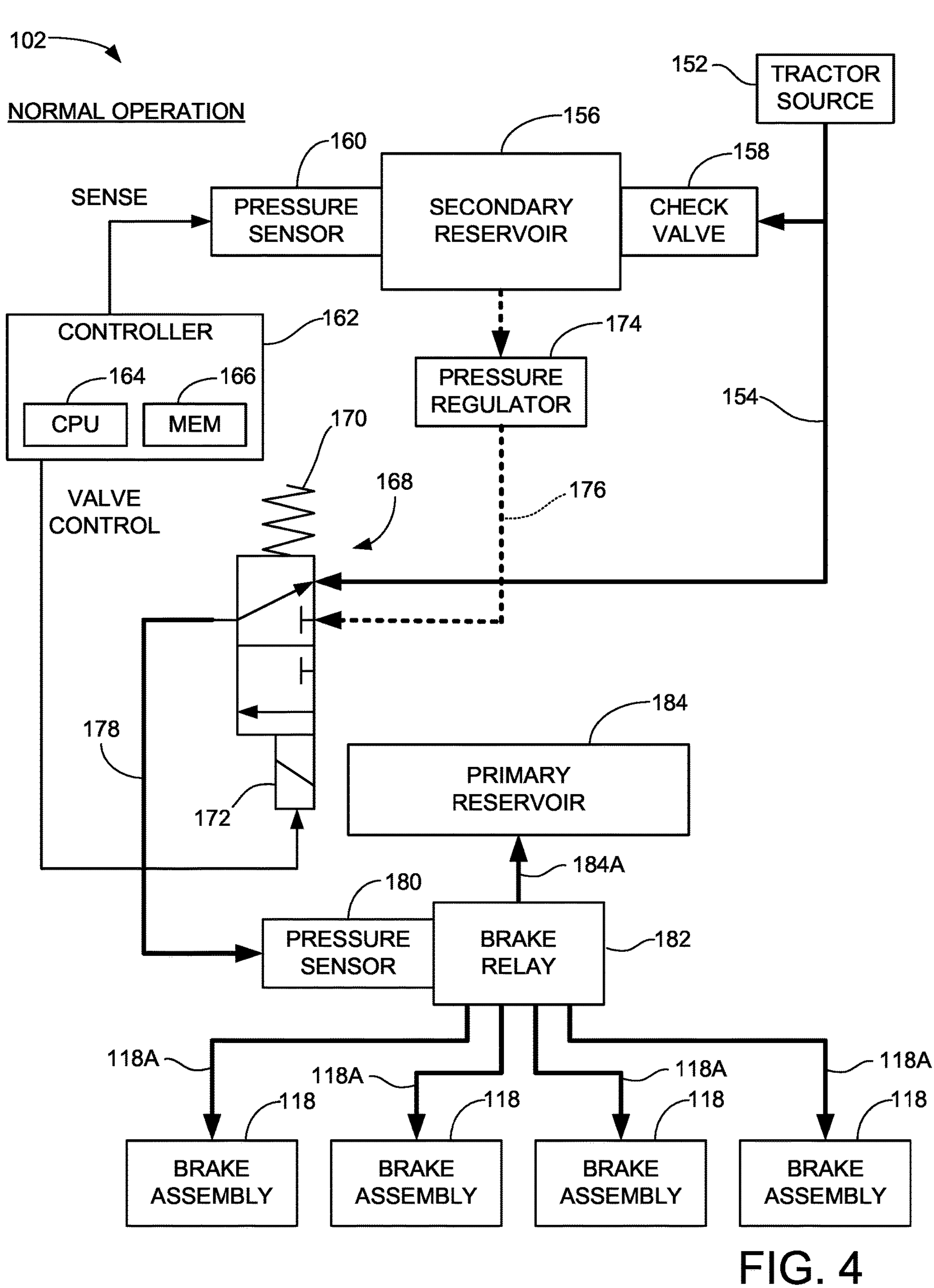
FIG. 4 is a schematic control diagram for the system of FIG. 3 operated in accordance with the arrangement in FIG. 1.

FIG. 4 is a schematic control diagram for the system 130 of FIG. 3 operated in accordance with the arrangement in FIG. 1 in some embodiments. From the foregoing discussion it will be evident that, during normal long haul operation, the self-contained braking system 130 allows normal operation in which the various brake assemblies 118 are be managed under the control of the tractor 101 and user thereof. Nonetheless, the system 130 remains present within the trailer 102 and at least operates in some environments in a passive, stand-by mode, including one in which data are collected and stored by the controller 132 with regard to system operation for subsequent reporting and use. In other embodiments, the self-contained braking system 130 may take a more active role in managing the braking system during normal operation.

A tractor source 152 is located in the tractor 101 and operates to supply pressurized air along an internal conduit 154 within the trailer 102. The tractor source 152 can include a compressor driven by the engine of the tractor, a reservoir, control electronics, valving, and other equipment as needed to generate and supply the pressurized air at the required pressure and volumetric levels. The source 152 also includes suitable conduit piping, such as the flexible conduit 108, necessary to transfer the pressurized air from the tractor to the internal conduit 154.

A secondary reservoir (tank) 156 is charged with a portion of the pressurized air through a one-way check valve 158. This may continue until the pressure within the secondary reservoir 156 reaches a predetermined maximum pressure, as determined by a pressure sensor 160 and a controller 162. The controller 162 generally corresponds to the controller 132 in FIG. 3 and includes a programmable processor (CPU) 164 and memory 166 to carry out top level control of the system. In some cases, the secondary reservoir may not be normally used during operation of the trailer 102 with the tractor 101 (or otherwise with the presence of the external air along conduit 154).

The pressurized air in conduit 154 is routed to an inlet port of a valve assembly 168. The valve assembly 168 includes a spring 170 which maintains the valve assembly 168 in a first position and a solenoid unit 172 which, when activated via a valve control signal from the controller 162, shifts the valve assembly 168 to a second position (see FIG. 5).

A pressure regulator 174 maintains the output of the secondary reservoir 156 at a suitable pressure level, such as about 70 psi. Other suitable levels can be used. It is contemplated that this level is at or above a suitable pressure level necessary to release the brake assemblies 118. A second internal conduit 176 (shown in broken line fashion) is routed from the pressure regulator 174 to a second input of the valve assembly 168. It will be noted that in the first position of the valve assembly 168, the pressure from the secondary reservoir 156 is at a closed inlet port of the valve assembly 168.

At the same time, the first position for the valve assembly 168 couples the upstream conduit 154 to an output conduit 178 which passes the pressurized air to a pressure sensor 180 and brake relay module 182. The brake relay module 182 distributes the pressurized air to each of the brake assemblies 118 associated with each of the wheel assemblies 116 of the trailer 102 (see FIGS. 1-3) using respective brake line inlet conduits 118A. The applied pressure is above a selected pressure level sufficient to overcome the bias force supplied by the spring assemblies and thereby releases the brake assemblies 118 and allows the wheels 116 to rotate as required during movement via the tractor 101. Additional air from the brake relay module 182 can also be diverted for accumulation in a primary reservoir (air tank) 184 using a reservoir inlet conduit 184A.

In this way, each of the primary and secondary reservoirs 156, 184 can accumulate up to a maximum volume of air while the trailer is operated. In some cases, the air can be bled off in a controlled fashion during operation to provide emergency air braking, as is generally known in the art. It is noted that the various embodiments are intended to complement, without otherwise interfering with, existing trailer systems. To this end, various additional interconnections and control features, such as connections between the various sensors and the controller, have been omitted for clarity, but will be understood to work during all modes of trailer operation. Similarly, other functions such as the use of ABS electronic braking systems, the use of the pressurized air to monitor and maintain tire pressures within the tires of the wheel assemblies 116, can readily be carried out, monitored or controlled by the system 130.

As noted above, in some conventional trailer systems the residual air in the lines or tanks within the trailer may be vented or otherwise bled off once the trailer 102 is parked and disconnected from the tractor 101. In at least some embodiments, the system 130 is configured to retain at least some of the accumulated pressurized air in at least the secondary reservoir 156. The air in the primary reservoir 184 may also be retained as required.

Figure 5:
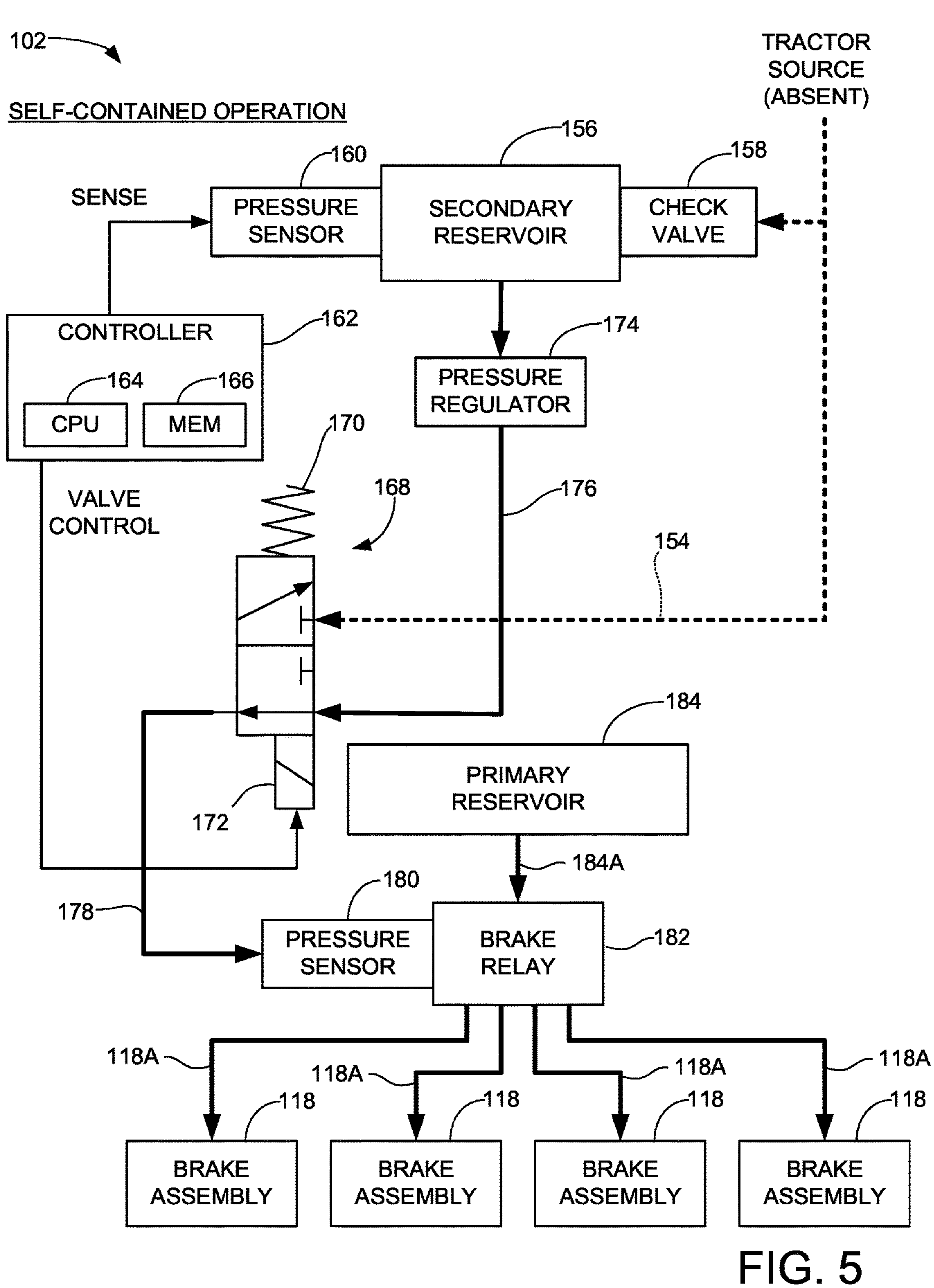
FIG. 5 is a schematic control diagram for the system of FIG. 3 operated in accordance with the arrangement in FIG. 2.

FIG. 5 shows the trailer 102 of FIG. 4 with the trailer configured to be moved by a yard shifter, such as corresponding to the arrangement shown above in FIG. 2. To this end, upon receipt and authentication of a brake release signal (as explained below in greater detail), the controller 162 activates the solenoid control portion 172 of the valve assembly 168, thereby closing off the conduit 154 and connecting the pressurized air from the secondary tank 156 (via the pressure regulator 174 and the conduit 176) to the downstream conduit 178. As before, pressurized air is supplied to the brake relay 182, enabling the brake assemblies 118 to be released and allowing the yard shifter vehicle 121 to move the trailer to the desired destination location.

The secondary reservoir 156 can be selected to be a suitable size to accommodate sufficient air pressure at the appropriate volume and pressure to maintain the brakes in a released state, including multiple activations and release cycles, to enable the vehicle 121 to move the trailer as needed within the yard. As noted above, an optional air compressor as denoted at 136 in FIG. 3 can be used to maintain the pressure at a suitable level. Additionally or alternatively, control valving can be used to tap into any reserve air retained in the primary reservoir 184 so that, as required, the accumulated air in the primary reservoir 184 can be routed via the conduit 184A to the brake relay module 182 for application to the brake assemblies 118 via conduits 118A.

While a shuttle type, spring biased and solenoid actuated valve is generally depicted at 168, it will be appreciated that any number of different valving arrangements, including pilot activated valves, multiple strings of valves, differential pressure valves, etc., can be used as desired.

Figures 6, 7, 8:
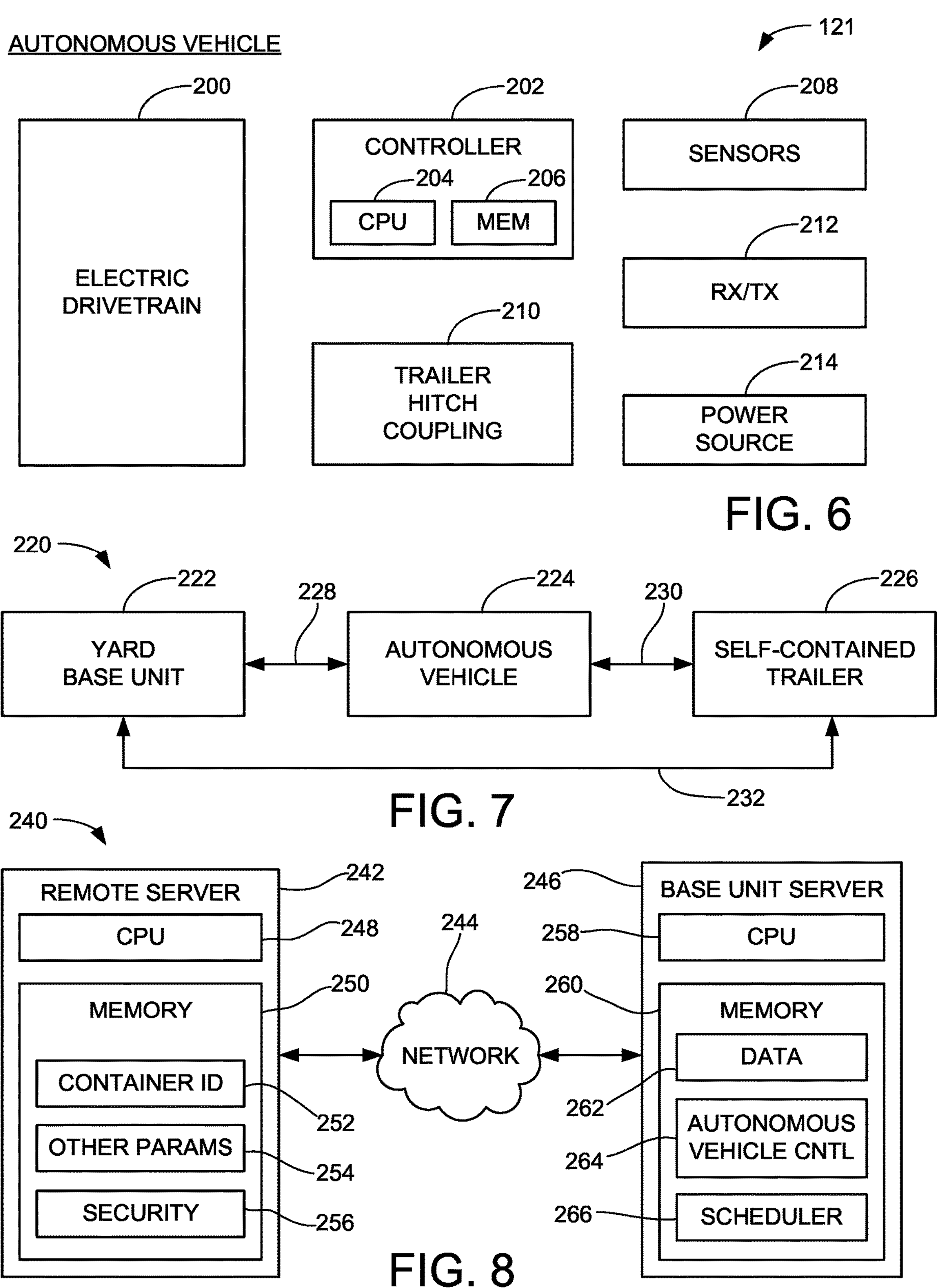
FIG. 6 is a functional block representation of the autonomous vehicle from FIG. 2 configured to communicate with the system of FIG. 3 in accordance with further embodiments.
FIG. 7 depicts a communication system that operates in accordance with further embodiments.
FIG. 8 depicts another communication system that operates in accordance with further embodiments.

It will be appreciated that the main aspects of the self-contained braking system 130 are wholly contained within the trailer 102 in the embodiments provided by FIGS. 3-5, so that the tractor trailer 102 is fully operational with substantially any form of conventional tractor, yard shifter, or other vehicle. Nonetheless, further embodiments utilize specially configured features in the yard shifter vehicle 121 to communicate and coordinate the operation of the trailer. To this end, FIG. 6 provides a functional block representation of the autonomous vehicle 121 from FIG. 2 in accordance with some embodiments. It will be appreciated that this is merely exemplary and is not limiting, as the various embodiments can be operated in a variety of different configurations and environments.

The autonomous yard shifter vehicle 121 is contemplated as a self-driving electric vehicle with an electric drivetrain 200. This drivetrain 200 may include one or more rechargeable battery packs, electric motors to drive the individual wheels of the vehicle, control circuitry, recharging circuitry, and so on. As noted above, other forms of drivetrains can be used such as a diesel or gasoline ICE, etc.

A vehicle controller 202 provides top level control of the vehicle 121 and may include hardware and or/software processing capabilities. The embodiment shown in FIG. 6 provides a processor (CPU) 204 and associated memory (MEM) 206 to store program instructions, data, etc. used to enable operation of the vehicle and communication with the trailer 102.

Because the vehicle 121 is autonomous, the controller 202 further includes processing capabilities to maneuver the vehicle (with or without the attached trailer 102) via various sensors 208, which can include LiDAR (light imaging distance and ranging), radar, proximity, optical camera, and other forms of sensors as known in the art. In some cases, the autonomous operation of the vehicle 121 can include sensor data supplied (such as via wireless link) by the trailer 102 to the vehicle 121 from the various sensors of the trailer.

Further features of the vehicle 121 include a trailer hitch coupling mechanism 210 (such as a fifth wheel coupler to accommodate the trailer kingpin), a communication (Rx/Tx) circuit 212, and a power source 214 to supply electrical power for use by the various circuitry of the vehicle. The power source may be incorporated as a part of the electric drivetrain or may be a separate power source (e.g., 12V vehicle battery, voltage regulation and recharging circuitry, etc.).

As noted above, no electrical or pneumatic conduit interconnections between the autonomous vehicle 121 and the trailer 102 are necessary or utilized, unlike the connections 108, 114 made between the trailer 102 and the tractor 101 as shown in FIG. 1. However, communications in the form of wireless data channels may be established between the vehicle 121 and the trailer 102, as well as with other devices as required.

FIG. 7 shows a communication system 220 made up of a yard base unit 222, an autonomous vehicle 224 (similar to the vehicle 121) and a self-contained trailer 226 (similar to the trailer 102) in accordance with some embodiments. Each of these respective units communicate via wireless communication channels 228, 230 and 232 as required in accordance with Lo-Ra or some other suitable communication protocol.

While not required, it is contemplated in at least some embodiments that the base unit 222 provides overall system task scheduling and management of the facility, which may involve many hundreds or even thousands of trailers 226 and correspondingly suitable numbers (tens, hundreds, etc.) of the autonomous vehicles 224. The base unit 222 sends trailer movement instructions to the autonomous vehicle(s) 224. The base unit 222 further communicates, either directly or indirectly through the autonomous vehicles 224, with the trailers 226, including authorized brake release and engagement signals to the braking systems of the trailers. Similar communications of commands, status and/or data are made by the vehicles 224 and the trailers 226, both with each other and with the base unit 222 as required.

FIG. 8 shows another communication system 240 in accordance with further embodiments. In this arrangement, a remote server 242 communicates over an intervening network 244 with a base unit server 246 as part of the trailer relocation operation described above. The remote server 242 can form a portion of a distributed data storage and processing system, a private or public cloud environment, or some other configuration. The network 244 can take any number and suitable forms of networks including but not limited to the Internet. The base unit server 246 can form a portion of the yard base unit 222 and may be located locally or remotely with respect to the yard (e.g., environment in which the trailers are moved).

The managing personnel for the facility can direct operations either locally or remotely via the remote server 242. The server includes a processor (CPU) 248 and memory 250 with various applications and other programming, tracking data, history data, accumulated statistics and other data as required. The memory 250 is shown in FIG. 8 to include container identification (ID) values 252, which are uniquely assigned to each trailer and can be used as part of the trailer access authentication process. Other parameters (params) associated with the trailers are shown generally at 254. Security authentication data 256 are used as described below to ensure the brake release system is only accessed and utilized at appropriate times and locations by authorized personnel.

The base unit server 246 similarly includes a processor (CPU) 258 and memory 260 which, as before, stores appropriate programming and data as needed to carry out the required functions. FIG. 8 shows the memory 260 to include overall system data 262, autonomous vehicle control application and control data 264, and scheduler application and control data 266. Other network arrangements and programming/data configurations can readily be used, so FIG. 8 is merely exemplary and is not limiting.

Figures 9, 10:
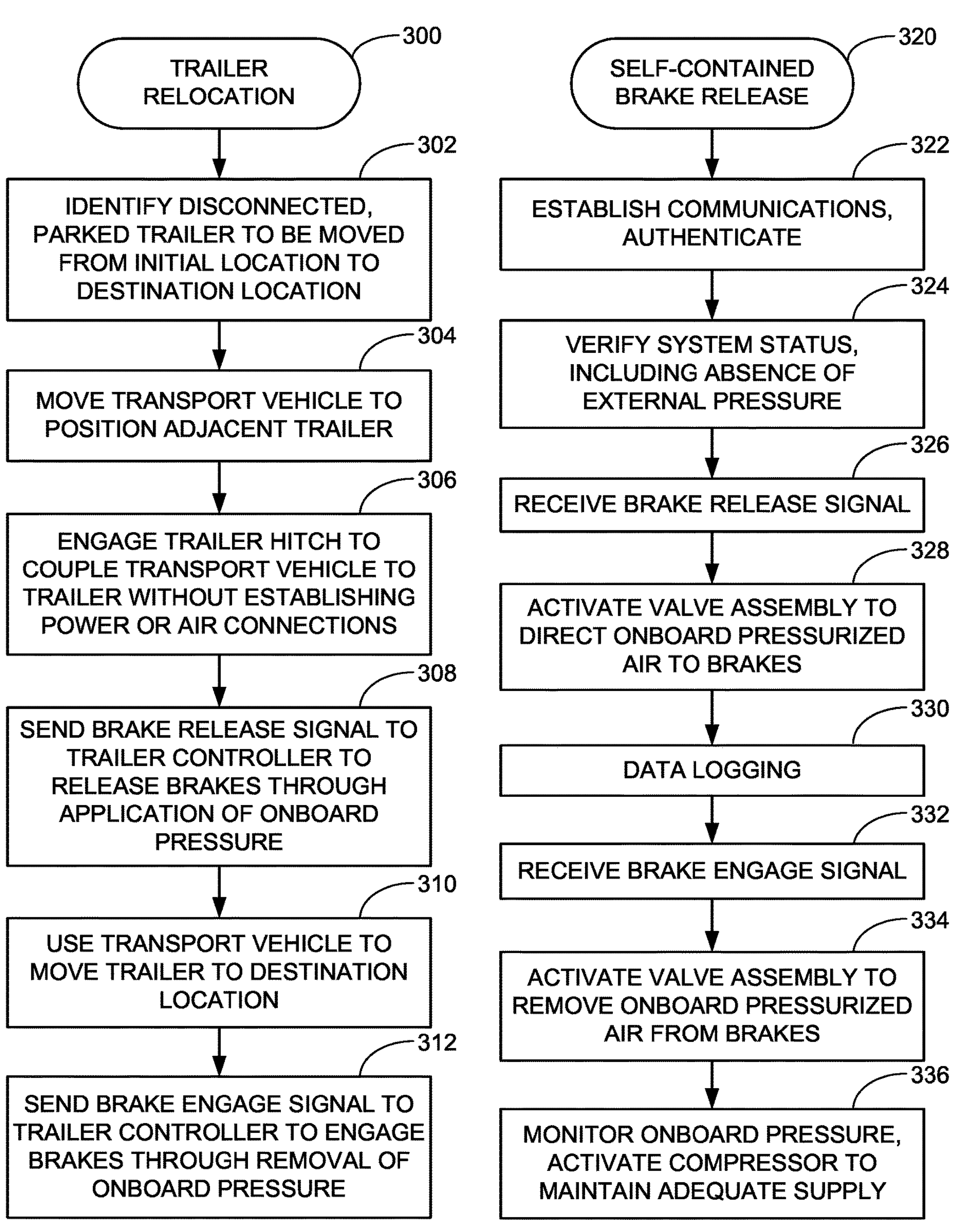
FIG. 9 is a flow chart for a TRAILER RELOCATION routine illustrative of steps carried out in accordance with some embodiments to move a trailer configured as set forth in FIGS. 3 and 5.
FIG. 10 is a flow chart for a SELF-CONTAINED BRAKE RELEASE routine illustrative of steps carried out by the trailer in conjunction with the routine of FIG. 9 in some embodiments.

FIG. 9 shows a flow chart for a TRAILER RELOCATION routine 300 illustrative of steps carried out in accordance with at least some embodiments to relocate trailers within a yard. The various steps are not limiting and can be modified, appended, omitted, performed in a different order, and so on.

It is contemplated that the various steps set forth in FIG. 9 are carried out in a system involving an autonomous vehicle such as 121, 224 to move a self-contained trailer such as 102, 226 under the direction and control of a base unit such as 222 that utilize one or more servers such as 242 and 246. This is not necessarily required, however. As such, the routine 300 more generally describes the use of a "transport vehicle," which may be a yard shifter or some other vehicle, including but not limited to a long haul tractor, and the movement may not necessarily be within a yard.

As shown by step 302, the routine proceeds by identifying a disconnected, parked trailer to be moved from an initial location to a destination location within the transport environment (yard). This may include a number of prior steps including delivery of the trailer via a tractor (FIG. 1), the disconnection and parking of the same in an appropriate parking lot area, the subsequent identification of the trailer to be moved within the yard (such as to a particular loading bay), the designation of a selected yard shifter vehicle to carry out the movement of the trailer, etc.

The selected transport vehicle (in this case, the yard shifter) is moved to a position adjacent the selected trailer at step 304, and engages the mechanical hitch coupling at step 306. It is noted that no electrical and/or pneumatic interconnections are made during these steps.

At step 308, a brake release signal is transmitted to the control circuitry of the trailer (e.g., Rx/Tx circuitry 144, controller 132, 162, etc.). As noted previously, this brake release signal is communicated as a wireless communication from the base unit, the yard shifter vehicle, or some other transmitter associated with the system external to the trailer. In response, the controller operates to release the brakes of the selected trailer by modulating the air pressure applied thereto using various mechanisms described above (e.g., valve assemblies 140, 168, conduits 146, 176, 178, brake relay 182, etc.) and the onboard air pressure stored by the trailer (e.g., the pressurized air stored in reservoirs 134, 156, 184, etc.).

The releasing of the brakes enables the yard shifter vehicle to move the trailer to the desired destination location, as indicated by step 310. This destination location, as well as the path taken, may be provided under the direction of the base unit server 246. It is contemplated that the movement of the trailer may be to multiple locations (e.g., a washing station, a loading dock, a tractor rig connection location, etc.), so that the brake system operates as required to brake and release the wheels of the trailer as required.

It may be necessary during the movement of the trailer to engage and disengage the brake assemblies in a controlled manner to slow or otherwise control the movement of the trailer by the yard shifter. Such braking may be different from the full-on parking brake configuration supplied by the full release of the air pressure from the system and full-on engagement of the brakes in a parked position. If electronic brakes are utilized, electrical communication signals can be sent from the autonomous vehicle to the controller of the trailer to activate the same as needed. Similarly, if modulated air braking is used to controllably brake the trailer, similar wireless communication signals can be supplied by the yard shifter vehicle to the controller, which operates as directed. In this way, the system provides the same level of control to the trailer as if the normally supplied electrical/pneumatic connections between the yard shifter and the trailer were in place.

Continuing with FIG. 9, at step 312 a brake engagement signal is transmitted to the controller of the trailer. As before, this signal can be provided by the yard shifter vehicle, the base unit, or some other portion of the system. The brake engagement signal directs the controller to remove or otherwise modulate the air pressure from the brake assemblies, thereby engaging the parking brake configuration as described above. As such, it is contemplated that step 312 will occur once the transport vehicle has completed movement of the trailer to the final position, and sends the disengagement signal in conjunction with other steps such as disconnection of the vehicle from the trailer.

FIG. 10 provides a flow chart for a SELF-CONTAINED BRAKE RELEASE routine 320 carried out in accordance with the foregoing discussion in accordance with at least some embodiments. It will be understood that the routine 320 represents steps that may be carried out by the controller of the trailer (e.g., controller 132, 162) during the routine 300 in FIG. 9. As before, the routine is merely exemplary and is not limiting in that other steps may be carried out as required.

The routine commences at step 322 where communications are initially established between the trailer controller and an upstream unit (such as the yard shifter controller 202, the base unit server 246, etc.). This may include any number of suitable wakeup signals, system initialization and acknowledgement signals, etc. It will be understood that suitable security protocols are utilized as known in the art to ensure that the entity contacting the trailer controller is an authorized entity and the communication is authenticated. This can include transmission of the unique container ID value, as well as other verification data. Cryptographic processing techniques including encryption, hash values, digital signatures, etc. can be utilized to authenticate each of the respective entities one to another. These and other security protocols can be beneficial in preventing the unauthorized unlocking (or engagement) of the trailer braking system, and are utilized as required.

As part of the initialization processing, the trailer controller can operate to verify the existing system status, step 324. This can include a determination of various system states including existing air pressures, sensor readings, valve settings, etc. In at least some embodiments, the trailer controller can further affirmatively determine that there is no currently applied external pressure to the system, such as via the trailer source 152 described above in FIG. 4.

In some embodiments, the trailer controller can determine a particular mode of operation for the trailer, including but not limited to a parked mode, a normal operational (long haul transport) mode, a self-contained operational (short haul transport) mode, etc. It will be appreciated that the parked mode involves no application of system air, the normal operational mode uses externally supplied air pressure and electric power/signals as in FIGS. 1 and 4, and the self-contained operational mode utilizes onboard air pressure and electrical power/signals as in FIGS. 2, 5 and 9. Other modes, including combinations of modes, can be used as required. The trailer controller can enact a selected mode based on programming and detection of the current state of the system.

Alternatively, the particular mode in which the trailer controller operates can be established by an external entity, such as a command provided by the yard shifter to the trailer controller to place the trailer in a selected mode. In these situations, the trailer controller can operate to verify the state of the system and confirm the current operational configuration of the trailer conforms to the desired or commanded mode. Exceptions can be handled in a variety of ways, including through notifications, enacting automated locking of the brakes or other lockout conditions until the condition is resolved, etc.

Once the trailer controller has determined that a short haul mode is appropriate, a brake release signal is received as shown by step 326. This signal corresponds to the signal transmitted in step 308 of FIG. 9. This command may be forwarded in any suitable format, including one or more frames or packets. The command may include verification data including but not limited to the container ID, ID information associated with the yard shifter vehicle, and so on. The command may be encrypted or otherwise cryptographically protected.

In some cases, a separate verification channel may be established and used to enable the trailer controller, via suitable sensors, to detect RFID or other information physically present on the yard shifter vehicle that is brought into proximity of the trailer (see step 304, FIG. 9), and to verify the sensed data matches the yard shifter ID data included within the command. In this way, the trailer controller can determine that the movement command is an authorized command, and the transport vehicle that is being coupled to the trailer is an authorized vehicle for that command. Various other alternatives will readily occur to the skilled artisan based on the present disclosure.

Upon receipt and decoding of an authorized brake release signal at step 326, the routine continues at step 328 to activate the valve assembly (e.g., such as through the controlled operation of valves 140, 168, etc.) in order to pressurize the system and release the brake assemblies of the trailer. This allows the yard shifter vehicle to move the trailer as described previously.

Various data logging operations are carried out at step 330 to record the activities associated with the trailer while the brakes have been self-released. This can include position, time, movement data, weight and loading, air pressure levels, proximity detections, and any other parameters from the respective sensors. For example, this can include the use of accelerometer sensors to measure movement, geolocation sensors (including but not limited to GPS) to track changes in geoposition, proximity sensors, door sensors, weight sensors, and so on. The accumulated data can be stored locally by the trailer controller and transmitted via wireless communication paths (see FIG. 7) at appropriate times.

It is contemplated that the yard shifter or other transport vehicle can concurrently operate to accumulate data regarding the trailer relocation operation. The accumulated data from both the yard shifter and the trailer can be separately communicated back to the base unit, which can monitor and compare the information, accumulate the data in a history log for further analysis including future scheduling of operations, maintenance, etc.

Geopositioning transmitters, beacons and other geofencing techniques can be employed during operation of the brake release system. In some embodiments, the trailer controller is configured to only allow self-contained release and operation of the onboard braking system if the trailer is located within a particular geographical region.

By way of illustration, a fleet of trailers may have predetermined service and depot locations for the trailers at particular locations across the country. The geographical boundaries of these locations can be established and preprogrammed as geofences with different rules of operation. The respective trailer controllers can use geolocation capabilities to ensure that a particular trailer is located within and remains within an authorized geolocation area before authorizing the release of the brakes using the onboard system. In further embodiments, the trailer controller can prevent use of external air pressure as well unless other authentication is supplied based on geoposition and other factors. This provides a further layer of protection for the system and ensures that the brakes are only released under authorized and controlled conditions.

Continuing with the flow of FIG. 10, a brake engagement signal is received at step 332, indicating the air pressure is to be removed from the system to engage the parking brakes of the trailer. This generally corresponds to step 312 in FIG. 9. Other detections may take place at this time, such as detection of the uncoupling of the trailer by the transport vehicle, etc. In response to the brake engagement signal, the trailer controller operates at step 334 to remove the application of pressurized air as described above and engage the brakes. The system will enter a waiting/sleep/standby mode awaiting further commands and operations.

Finally, step 336 shows a monitoring operation that can be carried out after step 334 or at other suitable times during the system operation. This monitoring operation includes monitoring the supply of onboard pressurized air and, as required, augmenting this amount such as through the use of the compressor (see 136, FIG. 3).

Figures 11, 12:
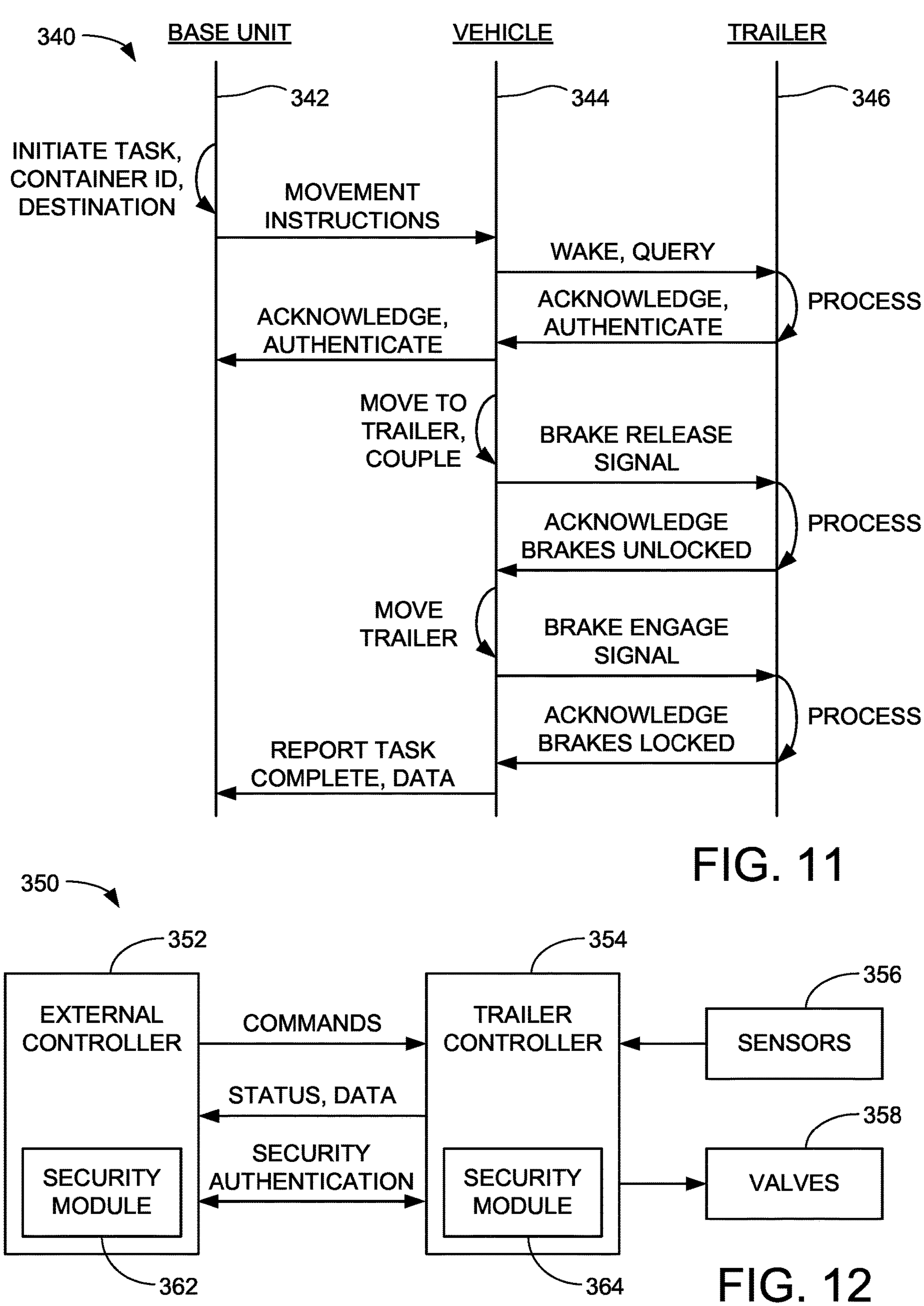
FIG. 11 is a timing sequence diagram to illustrate exemplary communication and action sequences carried out by the various elements in FIG. 7 in some embodiments.
FIG. 12 is a functional block diagram of another system constructed and operated in accordance with further embodiments.

FIG. 11 is a timing sequence diagram 340 to illustrate exemplary communication and action sequences carried out by a base unit 342, vehicle 344 and trailer 346 in accordance with further embodiments. For reference, these elements generally correspond to the elements discussed previously in FIG. 7, and the communications generally correspond to the routines of FIGS. 9-10.

As shown by FIG. 11, the processing commences by the base unit initiating a trailer relocation operation as a particular scheduled task or job. This may be part of a larger scheduling and management operation using the remote servers and other systems discussed above. As part of the scheduled task, the particular container ID, destination, and other information will be accumulated by the base unit 342.

A corresponding set of movement instructions and commands will be forwarded by the base unit 342 to the selected transport vehicle 344, which in turn will forward various initialization signals to the controller of the trailer 346. These are denoted as wake and system query signals, which are processed and responded to by the trailer 346 as an appropriate sequence of acknowledgement and authentication/verification signals as described above. As noted previously, any number and types of signals can be carried out to prepare the system for operation. In some cases, each of the base unit, vehicle and trailer can carry out authentication to establish a trust boundary so that each element is known and authenticated to each of the other elements, as is often utilized in low trust network environments.

The vehicle 344 proceeds to move to a position adjacent the trailer 346 and to engage the coupling mechanism. Concurrently with this operation, the vehicle 344 provides a brake release command which is processed and, if authenticated, the trailer 346 releases the brakes. As required, acknowledgement communications and other data exchanges are carried out as shown.

The trailer is next moved by the vehicle 344, after which a brake engagement command is issued, processed, received and acknowledged by the trailer 346, resulting in the trailer brakes being set to a locked condition. Finally, various accumulated data and statistics are communicated from the vehicle 344 and/or the trailer 346 to the base unit 342.

FIG. 12 provides a functional block diagram of yet another system 350 constructed and operated in accordance with further embodiments. The system 350 is similar to those described above and includes an external controller 352 in communication with a trailer controller 354, which in turn interacts with various trailer mounted sensors 356 and valves 358.

In this diagram, various commands are issued from the external controller 352 for processing by the trailer controller 354, and various status and data sets are communicated back to the external controller 352 to perform the various operations described herein. Moreover, respective security modules 362 and 364 are provided in the respective controllers 352, 354 to facilitate security authentication and exchanges to verify the respective entities are authentic and trusted devices, and to cryptographically protect the respective data and command exchanges as required.

Figure 13:
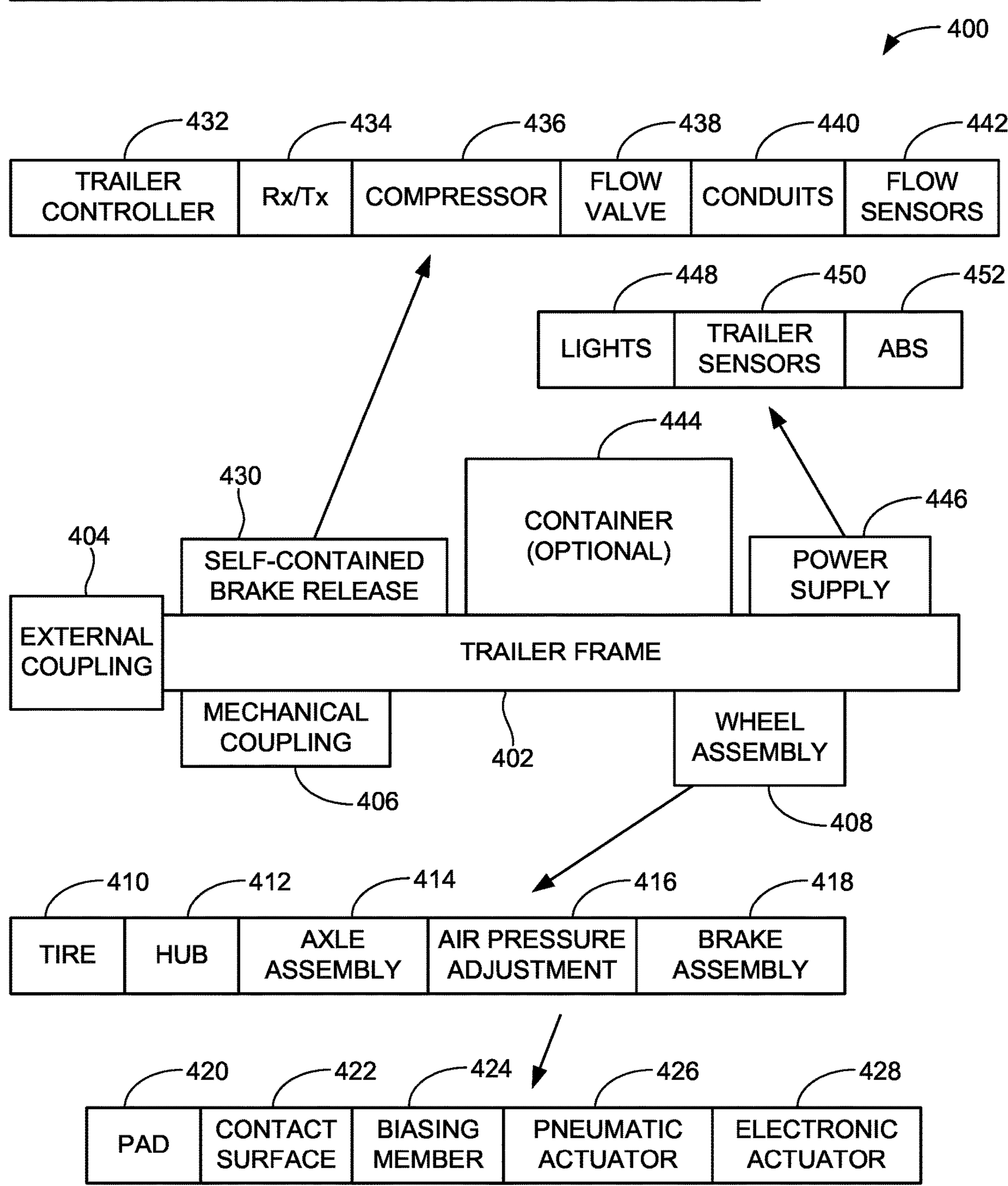
FIG. 13 is a functional block diagram of another tractor trailer with self-contained brake release capabilities in accordance with further embodiments.

FIG. 13 provides a functional block diagram representation of a tractor trailer 400 with self-contained brake release capabilities as embodied herein. The trailer 400 generally corresponds to the various trailers described above including the trailers 102, 226 and 346. It will be understood that the configuration of FIG. 13 is merely exemplary and is not limiting, so that other configurations, including configurations that include additional or alternative components, can readily be used.

The trailer 400 includes a rigid frame 402 that may extend substantially the length of the trailer 400 to support or otherwise interconnect the remaining portions of the trailer (although a segmented or multi-piece frame can be used). An external coupling port 404 provides interconnection capabilities of air pressure and/or electrical power from the associated transport vehicle (not separately shown). In some cases, multiple pneumatic connections may be established between the transport vehicle and the trailer to provide separate air pressure lines at different pressures and for different purposes. Similarly, the port 404 can be configured to accommodate the receipt of electrical power and/or communication signals from the transport vehicle, which can be accommodated by an interconnection as described above in FIG. 1.

A mechanical coupling mechanism 406 enables mechanical coupling with the transport vehicle to enable the trailer 400 to be towed and otherwise moved thereby (including backing of the trailer in a reverse direction). As described previously, this mechanical coupling mechanism 406 may take the form of a kingpin (e.g., a downwardly extending cylindrically shaped shaft that serves as a pivot point for a corresponding fifth wheel coupling plate), but substantially any form of coupling mechanism can be utilized sufficient to enable towing of the trailer by the transport vehicle.

The frame 402 is depicted as being supported above a road surface by a wheel assembly 408. The wheel assembly 408 includes a number of constituent elements including an inflated tire 410, a rotatable hub (rim) 412 to which the tire 410 is sealingly attached, and an axle assembly 414 adapted to enable rotation of the respective tire/hub combinations. A common trailer configuration uses a total of eight (8) tires/hubs to support the frame in a so-called dually configuration so that two pairs of tires/hubs are provisioned on each side of the trailer towards a rear portion of the trailer frame (see FIGS. 1-2 for an example of this configuration).

The wheel assembly 408 in FIG. 13 further is shown to include a brake assembly 418, which generally corresponds to the brake assemblies 118 described above. In at least some embodiments each brake assembly 418 includes a brake pad 420 and a corresponding brake surface 422. As is known in the art, the brake pad 420 is brought into contacting engagement with the brake surface 422, which may be a disc, a drum, or some other surface, in order to establish a frictional force sufficient to slow/stop/prevent rotation of the wheel assembly 408.

A biasing member 424 normally urges the brake pad 420 against the brake surface 422, with the biasing member taking the form of a spring or other mechanical biasing member. In this way, absent some sort of external control input, the brake assemblies 418 of the trailer 400 are configured to be in a locked position.

A pneumatic actuator 426 enables rotation of the wheel assembly 408 through the application of air at a sufficient pressure at or above a pressure threshold level to overcome the biasing force supplied by the biasing member 424. The pneumatic actuator is acted upon by the onboard pressure described above in FIGS. 4-5 to release the brake assemblies 118, 418. An electronic actuator 428 is additionally provided to enable controlled application of the brake pads 420 during normal operation of the trailer 400 when being towed by the transport vehicle. In this way, the trailer can be controllably braked to adjust the speed and momentum of the trailer during towing.

Continuing with FIG. 13, the frame 402 further supports a self-contained brake release system 430, corresponding to the various embodiments described above. The system 430 includes a trailer controller 432, an Rx/Tx communication circuit 434, an optional air compressor 436, one or more flow valves 438 used as described above to engage and release the brake assembly 418, various air flow conduits 440, and various sensors 442 that can operate as described above.

An optional container is depicted at 444, and as before this can be an enclosed box-type housing, a flat bed surface, a rack, a fluid tank, etc. sufficient to house and transport the freight to be carried by the trailer. Various electrical loads of the trailer are provisioned with electrical power from a power supply denoted at 446. These loads can include various aspects of the self-contained brake release system 430 as well as additional loads including but not limited to running/brake/illumination lighting 448, trailer sensors 450, anti-lock braking system (ABS) brake modules, and so on. The actual positioning and location of the various elements in FIG. 13 will depend upon the trailer configuration.

The power supply 446 can take a variety of forms, including but not limited to on-board batteries, generators, capacitors, solar panel arrays, hydrogen or other pressurized fuel gas storage systems, fuel cells, hydrolyzers, rectifiers, and so on. Some next generation trailers have been proposed that include large banks of lithium ion batteries (or other forms of batteries) that are charged and used to supply electrical power to the tractor trailer rig, loads of the trailer, or even to the trailer wheels themselves via electrical driving motors during transport. These and other trailer designs can include the use of solar panel arrays, such as on the container 444, to supply electrical power to the trailer. It will be appreciated that the self-contained brake release systems as variously embodied herein can be readily incorporated into any of these or other trailer configurations as desired.

In some cases, as described above the trailer controller 432 can evaluate system pressure using one of the flow sensors 442. In this way, upon receipt of a brake release command (or a brake engagement command), the trailer controller 432 can determine whether an external source is currently supplying air to an inlet conduit/port, and use this as part of the decision process regarding self-contained brake operation, including aborting the command based on the existing pressure being supplied to the trailer from an external source. As noted above, the air pressure supplied by the self-contained system can be used for other functions apart from brake release and activation, including but not limited to air pressure monitoring and adjustment, refrigeration, power generation, and so on.

It will now be appreciated that the various embodiments present a number of advantages and benefits over the existing art. The self-contained brake release processing of various embodiments enhances the ability of a trailer to be moved by a transport vehicle, such as a yard shifter, without requiring the provision of external electrical power and pressurized air to the trailer.

The trailer controller as variously embodied herein has the capabilities of various system functions including detecting the presence or absence of pressurized air, the ability to decode and enact self-contained brake release and other operational functions, while verifying system operation and status. In some embodiments, the on-board capabilities can be incorporated into existing systems, so that the trailer can be operated both in a normal mode under the direction of the transport vehicle under some conditions and in a self-contained mode in other conditions.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A tractor trailer with self-contained brake release capabilities, the tractor trailer comprising:

a frame supportable on a roadway by a wheel assembly, the wheel assembly having an air-release brake assembly configured to respectively facilitate rotation of the wheel assembly responsive to a pressure of pressurized air within a brake inlet conduit being above a selected pressure level and to reduce rotation of the wheel assembly responsive to the pressure of the pressurized air within the brake inlet conduit being below the selected pressure level;

a coupling mechanism supported by the frame and configured for mating engagement with a transport vehicle for towed movement of the trailer;

a reservoir supported by the frame and configured to store pressurized air;

a flow valve supported by the frame in fluidic communication with the reservoir and the brake inlet conduit of the brake assembly; and a trailer controller circuit supported by the frame and configured to perform a self-contained brake release operation while the trailer is in a stationary, parked position without a presence of pressurized air from an external source, the trailer controller circuit performing the self-contained brake release operation to release the brake assembly and permit relocation of the tractor trailer via rolling movement of the wheel assembly by, responsive to receipt of a wireless brake release command, transitioning the flow valve from a first valve position in which the reservoir is fluidically isolated from the inlet brake conduit to a second valve position in which the reservoir is fluidically coupled to the inlet brake conduit and the pressurized air from the reservoir flows through the brake inlet conduit to the brake assembly at a pressure that is at or above the selected pressure level; and a supply conduit extending from an exterior coupling port of the trailer to the flow valve, wherein in the first valve position the supply conduit is coupled to the inlet brake conduit using the flow valve, wherein in the second valve position the supply conduit is fluidically isolated from the inlet brake conduit, and wherein substantially no pressure above ambient atmospheric pressure is in the supply conduit over a continuous interval prior to and during the self-contained brake release operation so that the brake assembly is in a locked position while the flow valve is in the first valve position and the brake assembly transitions to an unlocked position as the flow valve is transitioned to the second valve position.

2. The tractor trailer of claim 1, wherein the exterior coupling port of the trailer is configured to establish a conduit interconnection with a selected end of a flexible conduit of the transport vehicle to provide pressurized air to the supply conduit from a transport vehicle source of pressurized air during a normal mode of operation during which the transport vehicle tows the tractor trailer at a highway speed, and wherein no conduit interconnection is provided to the exterior coupling port during the self-contained brake release operation.

3. The tractor trailer of claim 1, wherein the controller circuit determines, via a sensor, that no source of externally supplied pressurized air is present upon receipt of the wireless brake release command.

4. The tractor trailer of claim 1, wherein the trailer controller circuit is further configured to subsequently perform a self-contained brake engagement operation to engage the brake assembly once the trailer has come to another stationary, parked position after movement of the trailer while the brake assembly was released by, responsive to receipt of a wireless brake engagement command, transition the flow valve from the second valve position to the first valve position, thereby decoupling the reservoir from the brake inlet conduit and enabling a spring biasing assembly of the brake assembly to lock the brakes and prevent further rotation of the wheel assembly.

5. The tractor trailer of claim 1, further comprising an electrical power source supported by the frame, the electrical power source supplying electrical power to the trailer controller circuit and at least one electrical load of the tractor trailer during the self-contained brake engagement operation.

6. The tractor trailer of claim 1, wherein the tractor trailer is configured to be moved by the transport vehicle from an initial parked position to a destination parked position without any electrical interconnection or pneumatic interconnection between the transport vehicle and the tractor trailer.

7. The tractor trailer of claim 1, in combination with an autonomous, electrically powered yard shifter configured to move the tractor trailer from an initial parked position to a destination parked position, the yard shifter configured to transmit the brake release command to the trailer controller, the trailer controller circuit configured to release the brake assembly and allow movement of the tractor trailer by the yard shifter without any electrical or pneumatic interconnection between the tractor trailer and the yard shifter.

8. The tractor trailer of claim 1, wherein the brake release command comprises a container identification (ID) as a unique value assigned to the tractor trailer, and wherein the trailer controller circuit verifies the container ID corresponds to the tractor trailer using a locally stored value in memory prior to authorizing the self-contained brake release operation.

9. The tractor trailer of claim 1, further comprising an electrically driven air compressor supported by the frame and used, as directed by the trailer controller circuit, to replenish pressurized air within the reservoir.

10. The tractor trailer of claim 1, wherein the trailer controller circuit comprises a programmable processor and associated memory which stores program instructions which are executed by the programmable processor to perform the self-contained brake release operation.

11. The tractor trailer of claim 1, further comprising a plurality of sensors, wherein the trailer controller circuit performs data logging to accumulate data from the sensors associated with the movement of the trailer upon the releasing of the brake assembly by the trailer controller, and wherein the trailer controller circuit subsequently transmits, via a wireless communication channel, the accumulated data to a source of the brake release command.

12. The tractor trailer of claim 1, further comprising a geolocation sensor which enables the trailer controller circuit to detect a geolocation of the tractor trailer, wherein the trailer controller circuit is further configured to verify the detected geolocation of the tractor trailer is within a permitted area prior to performing the self-contained brake release operation, and wherein the trailer controller circuit is further configured to not perform the self-contained brake release operation responsive to a determination that the detected geolocation is not within a permitted area.

13. The tractor trailer of claim 1, wherein the brake assembly further comprises a pneumatic solenoid assembly coupled to a brake pad, wherein application of the pressurized air at a pressure above the selected threshold level advances the brake pad away from a brake surface to facilitate rotation of the wheel assembly, and wherein removal of the pressurized air enables a spring biasing mechanism of the pneumatic solenoid assembly to bring the brake pad into contacting engagement with the brake surface to prevent rotation of the wheel assembly.

14. The tractor trailer of claim 1, wherein the reservoir is filled with pressurized air from an external source of a selected tractor during a long haul transport mode of operation in which the tractor trailer is transported on a highway at a highway speed, wherein upon subsequent parking and disconnection of the selected tractor from the tractor trailer, the pressurized air from the external source is retained within the reservoir and subsequently directed to the brake assembly, via the flow valve, to unlock the brake assembly and allow movement of the trailer assembly during the self-contained brake release operation.

15. The tractor trailer of claim 1, further comprising a geolocation sensor which enables the trailer controller circuit to detect a geolocation of the tractor trailer, wherein the trailer controller circuit is further configured to verify the detected geolocation of the tractor trailer is within a permitted area prior to performing the self-contained brake release operation, and wherein the trailer controller circuit is further configured to not perform the self-contained brake release operation responsive to a determination that the detected geolocation is not within a permitted area.

16. The tractor trailer of claim 1, further comprising an electrical power source supported by the frame, the electrical power source supplying electrical power to the trailer controller circuit and at least one electrical load of the tractor trailer during the self-contained brake engagement operation.

17. The tractor trailer of claim 1, wherein the trailer controller circuit comprises a programmable processor and associated memory which stores program instructions which are executed by the programmable processor to perform the self-contained brake release operation, and wherein the programmable processor performs data logging to accumulate data from at least one sensor associated with the movement of the trailer upon the releasing of the brake assembly by the trailer controller, and wherein the programmable processor subsequently transmits, via a wireless communication channel, the accumulated data to a source of the brake release command.

18. A method, comprising:

storing a volume of pressurized air in a reservoir supported by a frame of a tractor trailer, the tractor trailer having a wheel assembly with an air-release brake assembly configured to respectively facilitate rotation of the wheel assembly responsive to a pressure of pressurized air within a brake inlet conduit being above a selected pressure level and to prevent rotation of the wheel assembly responsive to the pressure of the pressurized air within the brake inlet conduit being below the selected pressure level;

receiving, by a trailer controller circuit via a wireless communication channel, a brake release command while the trailer is disposed in a stationary parked position, the trailer controller circuit supported by the frame; and using the trailer controller circuit to perform a self-contained brake release operation responsive to receipt of the brake release command by transitioning a flow valve supported by the frame in fluidic communication with the reservoir and the brake inlet conduit of the brake assembly from a first valve position in which the reservoir is fluidically isolated from the inlet brake conduit to a second valve position in which the reservoir is fluidically coupled to the inlet brake conduit and the pressurized air from the reservoir flows through the brake inlet conduit to the brake assembly at a pressure that is at or above the selected pressure level, wherein the trailer controller circuit determines, via a sensor, that the tractor trailer is not connected to receive pressurized air from an external source responsive to receipt of the brake release command, and performs the self-contained brake release operation responsive to the sensor.

19. The method of claim 18, wherein the tractor trailer further comprises a coupling mechanism supported by the frame and configured for engagement with a transport vehicle to enable the transport vehicle to tow the tractor trailer, wherein the brake release command is transmitted by the transport vehicle, and wherein no air pressure connection is established between the tractor trailer and the transport vehicle to supply pressurized air from the transport vehicle to the tractor trailer during movement of the tractor trailer by the transport vehicle.

20. The method of claim 18, further comprising using the trailer controller circuit to subsequently perform a self-contained brake engagement operation to engage the brake assembly once the trailer has come to another stationary, parked position after movement of the trailer while the brake assembly was released by, responsive to receipt of a wireless brake engagement command, transition the flow valve from the second valve position to the first valve position, thereby decoupling the reservoir from the brake inlet conduit and enabling a spring biasing assembly of the brake assembly to lock the brakes to prevent further rotation of the wheel assembly.

21. The method of claim 18, further comprising using an electrical power source supported by the frame comprising at least one battery to supply electrical power to the trailer controller circuit and at least one electrical load of the tractor trailer during the self-contained brake engagement operation without a connection to the tractor trailer, via an electrical conduit, from an external power source.

22. A tractor trailer with self-contained brake release capabilities, the tractor trailer comprising:

a frame supportable on a roadway by a wheel assembly, the wheel assembly having an air-release brake assembly configured to respectively facilitate rotation of the wheel assembly responsive to a pressure of pressurized air within a brake inlet conduit being above a selected pressure level and to reduce rotation of the wheel assembly responsive to the pressure of the pressurized air within the brake inlet conduit being below the selected pressure level;

a coupling mechanism supported by the frame and configured for mating engagement with a transport vehicle for towed movement of the trailer;

a reservoir supported by the frame and configured to store pressurized air;

a flow valve supported by the frame in fluidic communication with the reservoir and the brake inlet conduit of the brake assembly;

a sensor; and a trailer controller circuit supported by the frame and configured to perform a self-contained brake release operation while the trailer is in a stationary, parked position without a presence of pressurized air from an external source, the trailer controller circuit performing the self-contained brake release operation to release the brake assembly and permit relocation of the tractor trailer via rolling movement of the wheel assembly by, responsive to receipt of a wireless brake release command, determining via the sensor that no source of externally supplied pressurized air is present, and transitioning the flow valve from a first valve position in which the reservoir is fluidically isolated from the inlet brake conduit to a second valve position in which the reservoir is fluidically coupled to the inlet brake conduit and the pressurized air from the reservoir flows through the brake inlet conduit to the brake assembly at a pressure that is at or above the selected pressure level.

23. The tractor trailer of claim 22, wherein the trailer controller circuit comprises a programmable processor and associated memory which stores program instructions which are executed by the programmable processor to perform the self-contained brake release operation.

24. The tractor trailer of claim 22, further comprising a plurality of additional sensors, wherein the trailer controller circuit performs data logging to accumulate data from the plurality of additional sensors associated with the movement of the trailer upon the releasing of the brake assembly by the trailer controller, and wherein the trailer controller circuit subsequently transmits, via a wireless communication channel, the accumulated data to a source of the brake release command.

25. The tractor trailer of claim 22, wherein the reservoir is filled with pressurized air from an external source of a selected tractor during a long haul transport mode of operation in which the tractor trailer is transported on a highway at a highway speed, wherein upon subsequent parking and disconnection of the selected tractor from the tractor trailer, the pressurized air from the external source is retained within the reservoir and subsequently directed to the brake assembly, via the flow valve, to unlock the brake assembly and allow movement of the trailer assembly during the self-contained brake release operation.

26. A tractor trailer with self-contained brake release capabilities, the tractor trailer comprising:

a frame supportable on a roadway by a wheel assembly, the wheel assembly having an air-release brake assembly configured to respectively facilitate rotation of the wheel assembly responsive to a pressure of pressurized air within a brake inlet conduit being above a selected pressure level and to reduce rotation of the wheel assembly responsive to the pressure of the pressurized air within the brake inlet conduit being below the selected pressure level;

a coupling mechanism supported by the frame and configured for mating engagement with a transport vehicle for towed movement of the trailer;

a reservoir supported by the frame and configured to store pressurized air;

a flow valve supported by the frame in fluidic communication with the reservoir and the brake inlet conduit of the brake assembly; and a trailer controller circuit supported by the frame and configured to perform a self-contained brake release operation while the trailer is in a stationary, parked position without a presence of pressurized air from an external source, the trailer controller circuit performing the self-contained brake release operation to release the brake assembly and permit relocation of the tractor trailer using the transport vehicle via rolling movement of the wheel assembly by, responsive to receipt of a wireless brake release command, transitioning the flow valve from a first valve position in which the reservoir is fluidically isolated from the inlet brake conduit to a second valve position in which the reservoir is fluidically coupled to the inlet brake conduit and the pressurized air from the reservoir flows through the brake inlet conduit to the brake assembly at a pressure that is at or above the selected pressure level;

wherein the reservoir is filled with pressurized air from an external source of a selected tractor during a long haul transport mode of operation in which the tractor trailer is transported on a highway at a highway speed; and wherein upon subsequent parking and disconnection of the selected tractor from the tractor trailer, the pressurized air from the external source is retained within the reservoir and subsequently directed to the brake assembly, via the flow valve, to unlock the brake assembly and allow movement of the trailer assembly during the self-contained brake release operation using the transport vehicle.

* * * * *